INVENTORS
JOSEPH C. WOLLARD
JOHN S. SLANEY
LESTER L. PREISS

INVENTORS
JOSEPH C. WOLLARD
JOHN S. SLANEY
LESTER L. PREISS

BY Shanley & O'Neil
ATTORNEYS

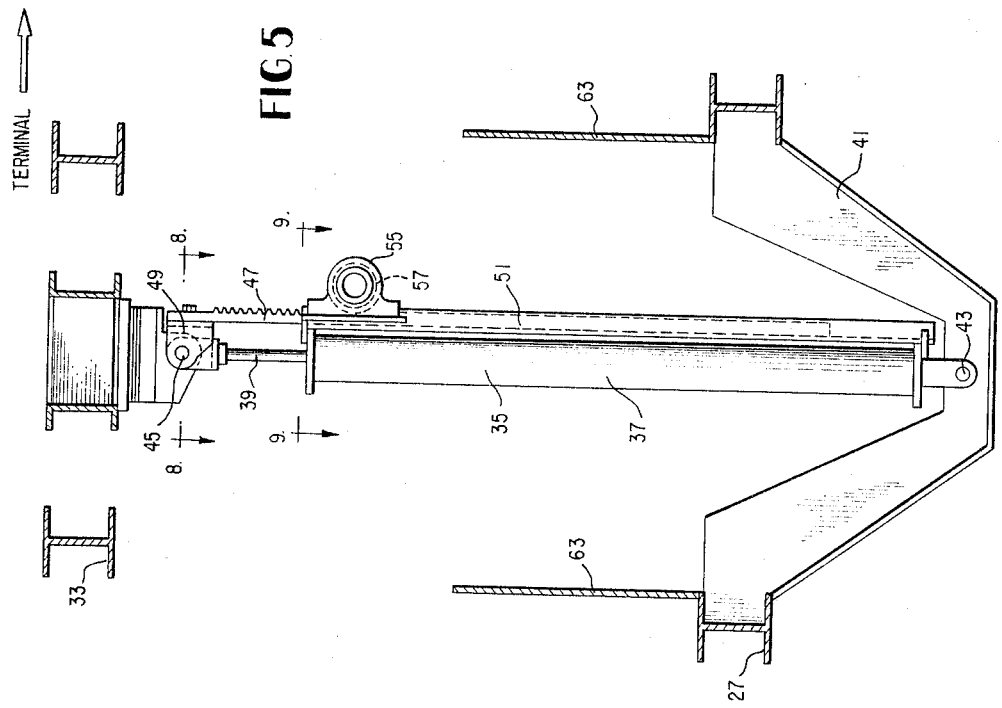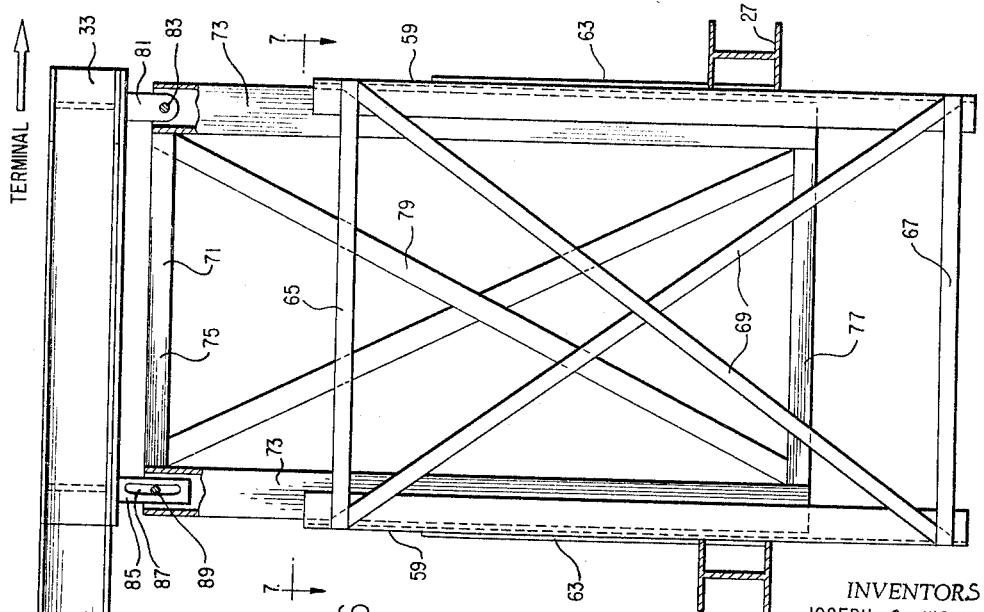

3,263,253
CONVEYANCE LOADER ELEVATING SYSTEM
Joseph C. Wollard, Miami Springs, John S. Slaney, Opalocka, and Lester L. Preiss, Miami, Fla., assignors to Wollard Aircraft Service Equipment Inc., a corporation of Florida
Filed Nov. 29, 1963, Ser. No. 326,794
9 Claims. (Cl. 14—71)

The present invention relates to aircraft loader elevating systems, more particularly of the type in which an elongated gangway provides covered and weather-proof protection for passengers walking through the gangway between an elevated door of an airport or other terminal building and an elevated door of an aircraft or other vehicle that is loading or unloading passengers.

It is an object of the present invention to provide aircraft loading apparatus adapted to register with aircraft doors of any height.

Another object of the present invention is the provision of aircraft loading apparatus that is structurally strong and yet light in weight.

Finally, it is an object of the present invention to provide passenger gangways and particularly aircraft loading apparatus, which will be relatively simple and inexpensive to manufacture, easy to install, operate, maintain and repair, and rugged and durable in use.

Other objects and advantages of the present invention will become apparent from a consideration of the following description, taken in connection with the accompanying drawings, in which:

FIGURE 5 is an enlarged elevational cross-sectional view taken on the line 5—5 of FIGURE 4 and viewed from the same side of the outer end of the gangway as the aircraft or other vehicle;

FIGURE 6 is an enlarged elevational cross-sectional view taken on the line 6—6 of FIGURE 4;

Figure 7:
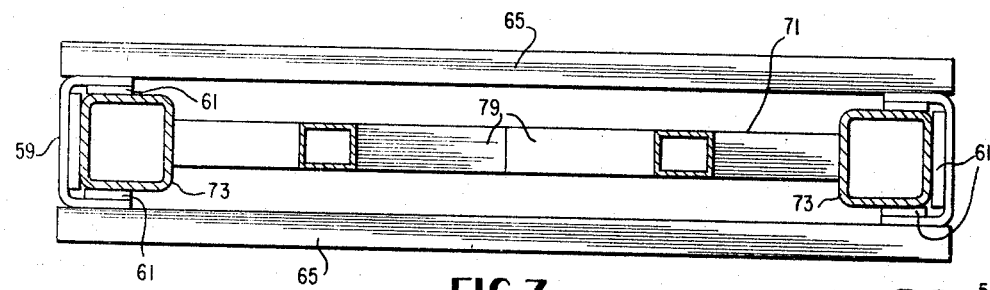
Figure 8:
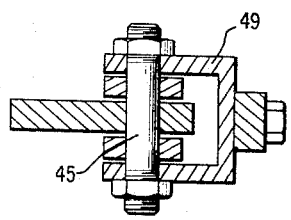
Figure 9:
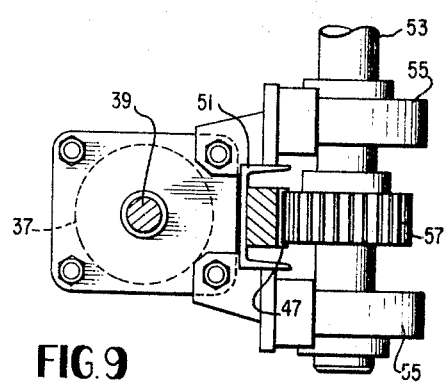

FIGURE 7 is a still further enlarged top cross-sectional view taken on the line 7—7 of FIGURE 6; and FIGURES 8 and 9 are enlarged cross-sectional views taken on the lines 8—8 and 9—9, respectively, of FIGURE 5.

Referring now to the drawings in greater detail, there is shown a passenger gangway 1 which is generally elongated and which extends between a fixed passenger terminal 3 such as an airport building and a movable vehicle 5 such as an aircraft and shields passengers from the weather as they pass between the terminal and the aircraft. Gangway 1 has a fixed inner end portion 7 which is secured to the terminal and an elongated midportion 9 which occupies a principal portion of the length of the gangway. The portion 9 is mounted for horizontal and vertical swinging movement on and relative to fixed inner end or terminal portion 7, by structure which is described in greater detail in our copending application filed under even date herewith and entitled "Aircraft Loader Pivot Apparatus" Serial No. 326,795. For this purpose, an upright stand 11 is provided which supports at least a principal portion of the weight of terminal portion 7 and midportion 9 of gangway 1 in the vicinity of the pivotal interconnection between these two portions.

At the other or outer or swinging end of gangway 1, there is a vestibule 13 adapted to register with a doorway of a vehicle such as an airplane. The vestibule is mounted on the outer end of midportion 9 for horizontal swinging movement, but not for vertical swinging movement, relative to midportion 9. At least a major portion of the weight of vestibule 13 and the free or swinging end of midportion 9 with which it pivotally interconnects is carried by a wheeled support 15 that is power driven to move in an arc at the center which is the upright axis of swinging movement of midportion 9 on terminal portion 7.

Midportion 9 is enclosed on all sides to protect passengers from the weather, and includes a pair of opposite sidewalls 17 that extend substantially the full length of midportion 9. Adjacent the outer end of midportion 9, a doorway 19 extends through that sidewall 17 which is on the right as the passenger walks from the terminal toward the vehicle. Doorway 19 gives access from inside gangway 1 to the upper landing of a stairway 21 that descends from adjacent doorway 19 to ground level. The height of the upper end of stairway 21 varies as wheeled support 15 is vertically extended and retracted, and stairway 21 is adapted to be inclined at different angles at different times so as to maintain the lower end of stairway 21 adjacent ground level at all times.

Vestibule 13 faces generally to the left as seen by a passenger walking toward the vehicle. Access between the gangway and the vehicle is provided by a plurality of doors 23, best seen in FIGURE 2, which face generally in a direction opposite doorway 19. Doors 23 are of an overall width, that is, a dimension lengthwise of the gangway, which is substantially greater than is necessary simply for the use of the passengers. Gangway 1 is inextensible; that is, the vertical axis about which midportion 9 swings relative to terminal portion 7 and the vertical axis about which vestibule 13 swings relative to midportion 9 are a fixed distance apart and this fixed distance does not vary. It is for this reason that the total width of doors 23 is greater than usual so that variations in the position of the vehicle can be accommodated not by extension of the gangway as in the prior art but rather by the fact that doors 23 are wide enough to accommodate a substantial margin of error in the placement of the vehicle for loading or unloading.

Wheeled support 15 is provided with a plurality of wheels 25 that are adjustably disposed on bolsters positionable so that the axes of wheels 25 lie on radii of the axis of vertical swinging movement of elongated midportion 9. Wheels 25 in turn are carried by an underframe 27 of wheeled support 15. Wheeled support 15 also includes a pair of telescoping and vertically extensible casing sections 29 by which a lifting mechanism generally referred to at 31 is enclosed within wheeled support 15.

The relationships of vestibule 13 to the adjacent structure of midportion 9 and wheeled support 15, and the relationships of stairway 21 and doors 23 to each other and to the adjacent structure of gangway 1, as well as the running gear of wheeled support 15 comprising wheels 25 and their relationship to underframe 27 and the rest of gangway structure, are all described in greater detail in another of our copending applications filed under even date herewith and entitled "Aircraft Loading Apparatus" Serial No. 326,771. The disclosure of these two copending applications is incorporated by reference herein so as to avoid the inclusion of unnecessary detail in the present application.

The present application is primarily concerned with the lifting mechanism and its associated apparatus of wheeled support 15 and its relationship to the outer end of the gangway. Referring now in greater detail to that lifting mechanism, it will be seen that the mechanism 31 acts between the underframe 27 of wheeled support 15 and an underframe 33 which slidably supports the outer end of gangway 1. The prime movers of the lifting mechanism are a pair of fluid motors 35 that are generally vertically disposed and that can best be seen in FIGURE 5. As will there be seen, each fluid motor 35 comprises a generally upright cylinder 37 with a piston rod 39 slidably emerging from the upper end thereof. A piston (not shown) is disposed on the lower end of piston rod 39 and slides in largely fluid-tight relationship within and in contact with the inner walls of cylinder 37. Also, fluid lines (not shown) are provided adjacent the upper and lower ends of cylinder 37 to supply and remove fluid under pressure to and from the opposite ends of cylinder 37 and from and to a source of fluid under pressure (not shown).

At their lower ends, the cylinders 37 of fluid motors 35 are each secured to a downwardly depressed midportion of a cradle 41 by means of the horizontal pivot 43. The axes of the two pivots 43 are coaxial and parallel to the axis of vertical swinging movement of midportion 9 relative to terminal portion 7. The upper end of each fluid motor 35, at the upper end of the piston rod 39, is secured to and below underframe 33 for relative swinging movement about a horizontal pivot 45 parallel to pivot 43 and to the pivotal axis of vertical swinging movement of midportion 9. The pivots 45 of the two fluid motors are coaxial.

The movable portions of fluid motors 35, that is, the assemblies of piston rods 39, have mounted for movement therewith each an elongated generally vertically disposed rack 47 provided with a plurality of rack teeth facing toward the terminal, that is, facing inwardly of the length of gangway 1. Each rack 47 is secured at its upper end to a laterally offset bracket 49 by which each rack is pivotally interconnected with the pivot 45 of the associated piston rod 39, as can best be seen by comparison of FIGURES 5 and 8. Each rack 47 is disposed in a vertical guideway 51 secured to the cylinder 37 and extending lengthwise thereof parallel of the axis of cylinder 37. Each rack 47, therefore, can slide freely vertically in its associated guideway 51.

A horizontal transverse shaft 53 extends between the two racks 47 and is disposed horizontally and is perpendicular to the length of gangway 1. Shaft 53 is journaled for rotation in journals 55 which are mounted fixedly on an upper portion of cylinder 37. Shaft 53 carries a pinion 57 adjacent either end thereof, and each pinion 57 is disposed between a pair of journals 55 and is in mesh with a rack 47. Pinions 57 are fixed on shaft 53. However, shaft 53 is free to turn as racks 47 move, but only when racks 47 move in unison at the same velocity and in the same direction. Thus, shaft 53 with its fixed pinions 57 thereon assures that the two fluid motors 35 will never get out of correspondence with each other and accordingly will never tend to twist or cant the outer end of the gangway.

The pivotal mounting of racks 47 adjacent their upper ends is dictated by the fact that underframe 33, fluid motors 35 and cradles 41 all turn relative to each other during lifting movement of the outer end of gangway 1. The pivotal mounting of racks 47 accommodates to this pivotal movement and permits racks 47 to have a limited measure of play relative to the associated structure thereby to avoid too rigid a gear train.

Means are also provided for guiding the vertical movement of the outer end of gangway 1 relative to wheeled support 15; and to this end, a plurality of pairs of channels 59 are fixedly mounted vertically on underframe 27 of wheeled support 15. The channels 59 are arranged in pairs, and the members of each pair of channels 59 are disposed adjacent opposite sides of wheeled support 15. The channels of each pair open toward each other, as can best be seen from FIGURE 7. Channels 59 carry antifriction shoes 61 of solid nylon or other low-friction material on their inner surfaces. Channels 59 are rigidly braced against movement from their predetermined vertical positions, by means of gusset plates 63 that extend diagonally between channels 59 and underframe 27, and also by top and bottom bars 65 and 67 that extend horizontally between the channels as do also diagonal bars 69. The bars 65, 67 and 69 extend between and brace the channels, thereby to make of each pair of opposed channels 59 an assembly that is rigid relative to wheeled support 15 and also to the components of the assembly.

A plurality of guide frames 71 depend from and are supported by underframe 33 and are slidably disposed within channels 59. To this end, each frame 71 comprises a pair of vertical parallel side members 73 that ride in channels 59, and a pair of top and bottom bars 75 and 77 that rigidly interconnect side members 73 adjacent their upper and lower ends. Diagonal bars 79 also cross between side members 73 and brace the assembly of frames 71. Frames 71 are disposed in vertical planes that are parallel to each other and that are parallel also to the length of elongated midportion 9, that is, that are parallel to the general longitudinal extent of gangway 1.

Underframe 33 is provided with downwardly extending ears 81 that receive pivot pins 83 fastened in the upper ends of the side members 73 of each frame 71 on the inner or terminal side of frames 71. Underframe 33 and the associated frame 71 are thus pivotally interconnected for relative vertical swinging movement about the horizontal axis of coaxial pivots 83, this latter axis being in turn parallel to the axis of vertical swinging movement of elongated midportion 9.

Frames 71 thus move straight up and down with the rising and falling of underframe 33 on the outer end of gangway 1. However, the underframe 33 from which frame 71 is suspended at pivot 83 is not only rising and falling but is also swinging vertically about a horizontal axis toward the inner end of the gangway. For this reason, and also further to guide the vertical movement of underframe 33 and to assure the proper relationship between underframe 33 and vertically movable frames 71, a special guide structure is provided on the other side of frames 71, that is, on the side of frames 71 remote from the terminal building. Specifically, elongated ears 85 are provided that are secured to and depend from underframe 33. Each ear 85 has a slot therethrough that is arcuate about pivot 83, and a horizontal pin fixedly carried at the upper end of the outer side frame member rides in slot 87. Therefore, as gangway 1 swings vertically about a horizontal axis toward the inner end of the gangway, underframe 33 is swinging relative to frames 71 about the axis of pivots 83; and this latter relative swinging movement is accommodated and guided by slot 87 and pin 89.

Figure 1:
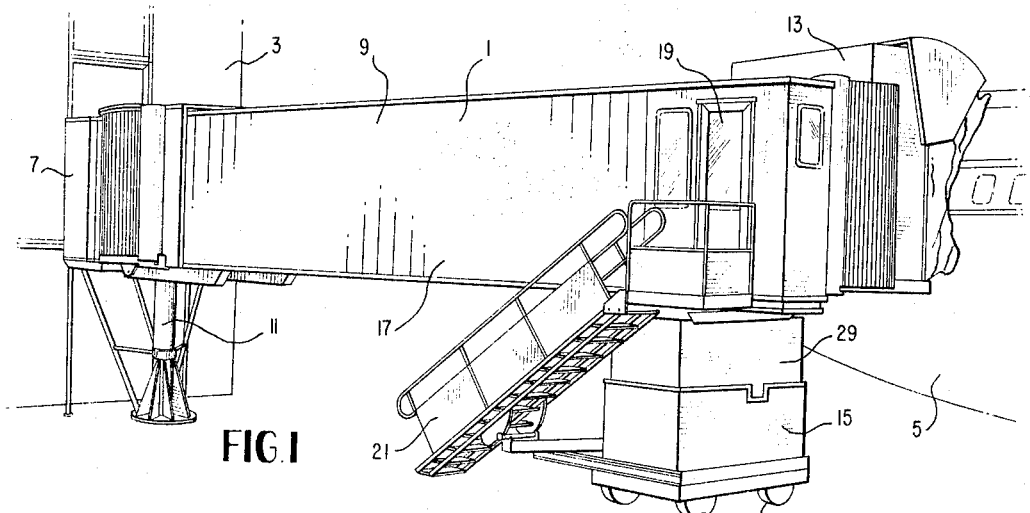
FIGURE 1 is a prespective view of a passenger gangway in operation between a passenger terminal and an aircraft.
Figure 2:
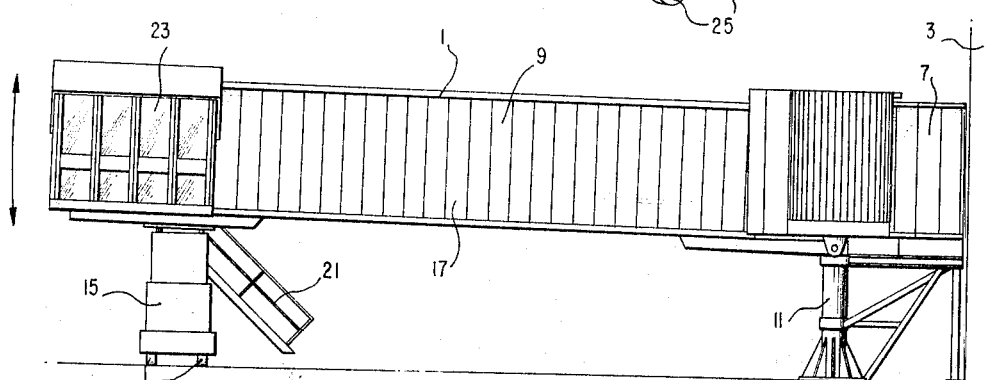
FIGURE 2 is a side elevational view of the structure shown in FIGURE 1, viewed from the vehicle or opposite side from FIGURE 1.
Figure 3:
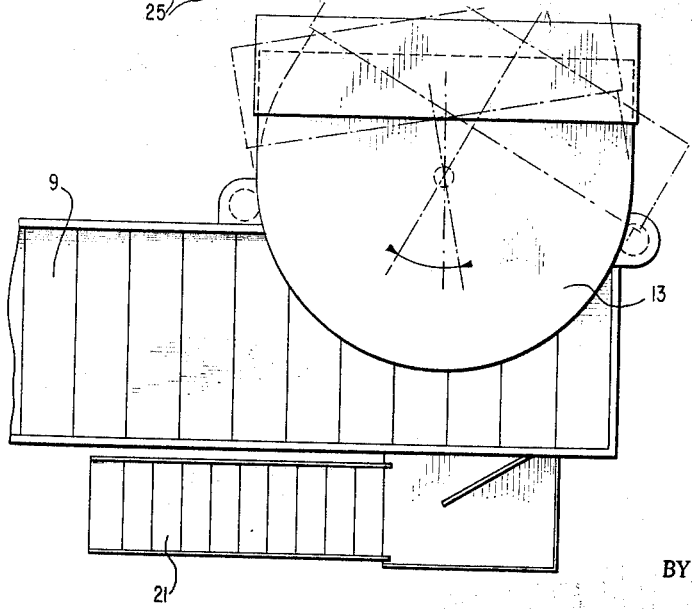
FIGURE 3 is an enlarged fragmentary top plan view of the vehicle end of a passenger gangway according to the present invention.
Figure 4:
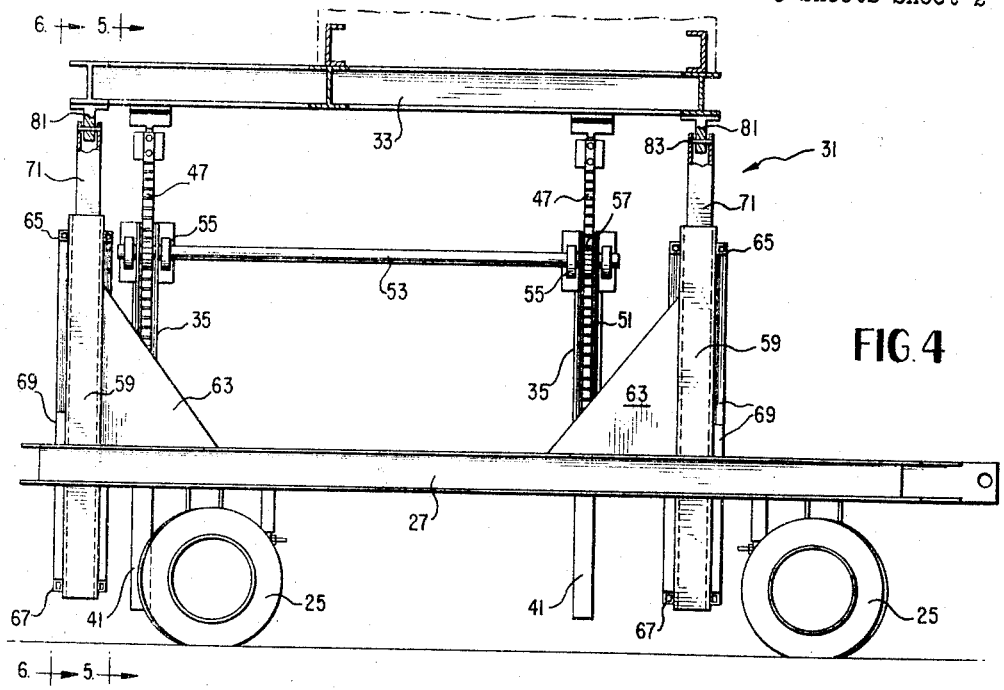
FIGURE 4 is a plan view of the wheeled support and lifting apparatus of the present invention, with the associated casings removed, looking outwardly from the terminal toward the outer end of the gangway.

In practice, therefore, it will be apparent that the gangway of the present invention is ordinarily maintained in a horizontally swung position in which it is disposed adjacent or along terminal 3 and is not swung out to a position of use as in FIGURES 1 and 2. However, when an aircraft taxis adjacent the terminal building to receive or discharge passengers, and the aircraft is stopped, for example, in the position shown in FIGURE 1, then the gangway is swung out to a position of use as in FIGURES 1 and 2. The various swung positions of gangway 1 and the extra width of doors 23 make it possible to position the aircraft in any of a plurality of positions for cooperation with gangway 1.

When gangway 1 has reached its rest position, the lifting mechanism 31 is actuated to raise or lower the free end of gangway 1 until the flooring of vestibule 13 is at an appropriate level, and vestibule 13 is swung horizontally by power means (not shown) until doors 23 are parallel to the aircraft doorway. The vestibule of the gangway is hooded and provided with flexible curtains, which can be disposed about the aircraft doorway to seal against adverse weather conditions, after which the aircraft doorway can be opened and passengers can pass back and forth between the aircraft and the terminal without having to descend stairs from the aircraft or be exposed to the weather. Similarly, crew members and aircraft or airport service personnel can freely pass betaween the interior and exterior of the aircraft by using doorway 19 and stairway 21.

After the loading or unloading operation is complete, the wheeled support 15 can simply be driven back so as to swing the free end of the gangway back to a position of non-use.

It will accordingly be noted that the lifting mechanism for the outer end of the gangway of the present invention is characterized by a number of novel features and relationships. Among these are the mounting of the fluid motors and the rack and pinion means so that the fluid motors are maintained in coordination with each other. Another unique feature is the structure and function of the guide frames and their relationship to their supports and to each other, to the gangway as a whole, and to the underframe of the outer end of the gangway. Still another unique feature is the relationship of the fluid motors and the guide frames to each other such that upon vertical movement of the outer end of the gangway, none of these elements of the lifting frame tends to bind, but rather all tend to adjust to changes in the relationships of the parts due to the various movements of the parts relative to each other as described above.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention as those skilled in this art will readily understand. Such modifications and variations are considered to be within the purview and scope of the present invention as defined by the appended claims.

What is claimed is:

1. A conveyance loader comprising
   (a) an elongated gangway mounted for vertical swinging movement about a horizontal axis,
   (b) an upwardly extensible support means for supporting an outer portion of the elongated gangway,
   (c) the support means comprising a gangway support portion carried by said outer portion of the elongated gangway and a ground supported portion,
   (d) a pair of extensible fluid motor means disposed one at either side of the support means and connected between one support means portion and the other support means portion for raising and lowering said outer portion of the elongated gangway,
   (e) a pair of rack means carried by one support means portion and disposed one on either side of the support means, and
   (f) unitary pinion gear means carried by the other support means portion in mesh with both of the rack means to constrain the two extensible fluid motor means to uniform upward and downward movement.

2. A passenger gangway as claimed in claim 1, the fluid motor being pivotally interconnected adjacent their opposite ends with the one support means and the other support means for vertical swinging movement of the motors relative to the one support means and the other support means about horizontal axes that are parallel to each other and to the first-named horizontal axis.

3. A passenger gangway as claimed in claim 2, said pinion gear means being carried by said fluid motor means.

4. A conveyance loader comprising
   (a) an elongated gangway mounted for vertical swinging movement about a horizontal axis,
   (b) an upwardly extensible support means for supporting an outer portion of the elongated gangway,
   (c) the support means comprising a gangway support portion carried by said outer portion of the elongated gangway and a ground supported portion,
   (d) one of the support means portions comprising an elongated pair of structural members disposed in upright, parallel relationship one at either side of the support means, the structural members having exterior wall surfaces,
   (e) the other of the support means portions comprising a pair of elongated, hollow members disposed in upright parallel relationship,
   (f) the hollow members having interior wall surfaces snugly but movably embracing exterior wall surfaces of the elongated structural members and constraining the elongated structural members to upward and downward movement parallel to the hollow members,
   (g) a pair of extensible fluid motor means disposed one at either side of the support means and connected between the one support means portion and the other support means portion for raising and lowering the outer portion of the elongated gangway,
   (h) a pair of rack means carried by a first of said support means portions and disposed one on either side of the support means, and
   (i) unitary pinion means carried by a second of said support means portions in mesh with both of the rack means to constrain the two extensible fluid motor means to uniform upward and downward movement.

5. A gangway as claimed in claim 1 and guide means disposed between the outer end of the passageway and the support means, the guide means including a pin and arcuate slot sliding connection with the slot arcuate about and spaced from the second horizontal axis for guiding the vertical swinging movement about the second horizontal axis.

6. A conveyance loader comprising
   (a) an elongated gangway mounted for vertical swinging movement about a horizontal axis,
   (b) a vertically extensible support for an outer portion of the elongated gangway,
   (c) the support comprising a frame secured to the underside of said outer portion,
   (d) the frame comprising a pair of members disposed one at either side of the support,
   (e) a pair of vertically disposed channel members in opposed relation to each other in which said members slide vertically,
   (f) means pivotally interconnecting the frame with said underside for vertical swinging movement of the frame and said elongated gangway relative to each other about a second horizontal axis parallel to the first-named horizontal axis, and
   (g) guide means disposed between said elongated gangway and said frame and including a pin and slot sliding connection with the slot arcuate about and spaced from said second axis for guiding said vertical swinging movement of the frame and said elongated section relative to each other.

7. A conveyance loader comprising
   (a) an elongated gangway mounted for vertical swinging movement about a horizontal axis,
   (b) a vertically extensible support for an outer portion of the elongated gangway,
   (c) a frame having a pair of upright frame members disposed one at either side of the support,
   (d) a pair of upright disposed channel members in opposed relation to each other in which the frame members slide upwardly and downwardly,
(e) the frame and the channel members acting between the support and the outer portion to control movement of the outer portion relative to the support,
(f) fluid motor means carried by the support for raising and lowering said outer portion, said fluid motor means comprising a plurality of extensible fluid motors having fixed and movable elements,
(g) rack means disposed in unitary assembly with one of the elements of each of the fluid motors, and
(h) unitary pinion means in unitary assembly with the other of the elements of each of the fluid motors and in mesh with the rack means to maintain the positions of the movable portions of the fluid motors in correspondence with each other.

8. A conveyance loader comprising
(a) an elongated gangway mounted for vertical swinging movement about a horizontal axis,
(b) a vertically extensible support for an outer portion of the elongated gangway,
(c) the support comprising a plurality of spaced frames parallel to each other and to the length of the elongated gangway and secured to the underside of said outer portion,
(d) each frame comprising a pair of members disposed one on either side of the support,
(e) pairs of vertically disposed channel members in opposed relation to each other in which said members slide vertically,
(f) means pivotally interconnecting the frames with said underside for vertical swinging movement of the frames and said elongated gangway relative to each other about a second horizontal axis that is parallel to the first-named horizontal axis, and
(g) guide means disposed between said elongated gangway and each said frame and including a pin and slot sliding connection with the slot arcuate about and spaced from said second axis for guiding said vertical swinging movement of the frames and said elongated section relative to each other.

9. A conveyance loader comprising
(a) an elongated gangway mounted for vertical swinging movement about a horizontal axis,
(b) a ground supported vertically extensible support for an outer portion of the elongated gangway,
(c) the support comprising a plurality of spaced frames parallel to each other and to the length of the elongated gangway and secured to the underside of said outer portion,
(d) each frame comprising a pair of members disposed on one side of the support,
(e) the ground engaging portion of the support comprising pairs of vertically disposed channel members in opposed relation to each other in which said members slide vertically,
(f) fluid motor means carried by the support for raising and lowering said outer portion,
(g) said fluid motor means comprising a plurality of extensible fluid motors,
(h) rack means disposed in unitary assembly with the movable portions of the fluid motors, and
(i) unitary pinion means in mesh with all the rack means to maintain the postions of the movable portions of the fluid motors in correspondence with each other.

References Cited by the Examiner

UNITED STATES PATENTS

| | | | |
|---|---|---|---|
| 2,688,761 | 9/1954 | Good | 14—71 |
| 2,778,674 | 1/1957 | Attendu | 14—71 X |
| 3,110,048 | 11/1963 | Bolton | 14—71 |
| 3,184,772 | 5/1965 | Moore | 14—71 |

CHARLES E. O'CONNELL, *Primary Examiner.*

N. C. BYERS, *Assistant Examiner.*